(12) United States Patent
Karl

(10) Patent No.: US 10,519,293 B2
(45) Date of Patent: Dec. 31, 2019

(54) BARRIER LAYER AND USE THEREOF IN COATING SYSTEMS ON PLASTIC SUBSTRATES

(71) Applicant: MANKIEWICZ GEBR. & CO. GMBH & CO. KG, Hamburg (DE)

(72) Inventor: Hans-Juergen Karl, Flensburg (DE)

(73) Assignee: MANKIEWICZ GEBR. & CO. GMBH & CO. KG, Hamburg (DE)

( * ) Notice: Subject to any disclaimer, the term of this patent is extended or adjusted under 35 U.S.C. 154(b) by 0 days.

(21) Appl. No.: 15/514,825

(22) PCT Filed: Sep. 30, 2015

(86) PCT No.: PCT/DE2015/000475
§ 371 (c)(1),
(2) Date: Mar. 28, 2017

(87) PCT Pub. No.: WO2016/050231
PCT Pub. Date: Apr. 7, 2016

(65) Prior Publication Data
US 2017/0226311 A1     Aug. 10, 2017

(30) Foreign Application Priority Data
Sep. 30, 2014    (DE) .................. 10 2014 014 098

(51) Int. Cl.
| | | |
|---|---|---|
| *C08K 3/00* | (2018.01) | |
| *C08K 3/014* | (2018.01) | |
| *C08J 7/04* | (2006.01) | |
| *C08G 18/48* | (2006.01) | |
| *C08G 18/62* | (2006.01) | |
| *C08G 18/73* | (2006.01) | |
| *C09D 175/04* | (2006.01) | |
| *C08K 7/20* | (2006.01) | |
| *C08K 7/22* | (2006.01) | |
| *C08K 3/08* | (2006.01) | |

(52) U.S. Cl.
CPC .......... *C08K 3/014* (2018.01); *C08G 18/4879* (2013.01); *C08G 18/6212* (2013.01); *C08G 18/6279* (2013.01); *C08G 18/73* (2013.01); *C08J 7/047* (2013.01); *C08K 3/08* (2013.01); *C08K 7/20* (2013.01); *C08K 7/22* (2013.01); *C09D 175/04* (2013.01); *C08J 2375/04* (2013.01); *C08K 2003/085* (2013.01); *C08K 2003/0856* (2013.01); *C08K 2003/0862* (2013.01); *C08K 2003/0881* (2013.01); *C08K 2003/0893* (2013.01)

(58) Field of Classification Search
CPC . C08K 3/014; C08K 7/20; C08K 7/22; C08K 3/20; C08K 3/04; C08K 3/00; C08G 18/4879; C08G 18/6212; C08G 18/73; C08J 7/047
USPC ....................................................... 523/219
See application file for complete search history.

(56) References Cited

U.S. PATENT DOCUMENTS

| | | | |
|---|---|---|---|
| 4,780,484 A | 10/1988 | Schubert et al. | |
| 7,968,168 B2 * | 6/2011 | Bauer | B32B 27/08 |
| | | | 156/307.4 |
| 2004/0228980 A1 | 11/2004 | Wissing et al. | |
| 2005/0271882 A1 | 12/2005 | Walther et al. | |
| 2006/0257671 A1 | 11/2006 | Yahkind | |
| 2008/0230742 A1 | 9/2008 | Janssen et al. | |
| 2009/0048391 A1 | 2/2009 | Sumi et al. | |
| 2010/0113662 A1 | 5/2010 | Masutani et al. | |
| 2010/0120971 A1 | 5/2010 | Sumi et al. | |
| 2013/0288006 A1 | 10/2013 | Greene et al. | |

FOREIGN PATENT DOCUMENTS

| | | |
|---|---|---|
| CN | 1454240 A | 11/2003 |
| CN | 101426866 A | 5/2009 |
| JP | 63-270726 A | 11/1988 |
| JP | 4-366114 A | 12/1992 |
| JP | 5-31457 A | 2/1993 |
| JP | 2000-73001 A | 3/2000 |
| RU | 2 324 672 C2 | 5/2008 |
| RU | 2 331 658 C2 | 8/2008 |
| RU | 2 469 057 C2 | 12/2012 |

OTHER PUBLICATIONS

Product Information: "3M™ Glass Bubbles iM16K", 3M, pp. 1-2 (2013).

* cited by examiner

*Primary Examiner* — Hannah J Pak
(74) *Attorney, Agent, or Firm* — Norman B. Thot

(57) ABSTRACT

A coating material for producing a barrier layer on a plastic substrate includes an isocyanate-containing hardener component and a hydroxy-functional binder component. The hydroxy-functional binder component includes an aqueous polymer dispersion which includes a polyphenylene ether or a copolymer of fluorinated ethylene and a vinyl ether, glass hollow bodies, and at least one of an inorganic filler and an inorganic pigment.

15 Claims, No Drawings

BARRIER LAYER AND USE THEREOF IN COATING SYSTEMS ON PLASTIC SUBSTRATES

CROSS REFERENCE TO PRIOR APPLICATIONS

This application is a U.S. National Phase application under 35 U.S.C. § 371 of International Application No. PCT/DE2015/000475, filed on Sep. 30, 2015 and which claims benefit to German Patent Application No. 10 2014 014 098.9, filed on Sep. 30, 2014. The International Application was published in German on Apr. 7, 2016 as WO 2016/050231 A1 under PCT Article 21(2).

FIELD

The present invention relates to coating materials for producing a barrier layer, and to their use in coating systems for substrates of plastics as well as to processes for the preparation of a coating containing a barrier layer.

BACKGROUND

Components which are produced from fiber plastic composite materials or from thermoplastics generally have a non-uniform, rough surface. The inserted fibers are present on the surface and pores and voids appear which arise during the solidification of thermoplastics or during the curing of a duromeric resin matrix. This interference to the surface is particularly undesirable in the edge and in visible areas.

Components made of fiber plastic composite material are frequently used for the finishing or lining of vehicle interior spaces. Components which are used for finishing or lining in interior spaces of vehicles for transporting passengers are referred to below as interior components. The visible surfaces of the components used are provided with an individual decor for the equipment or the optical design of the vehicle interior. In this case, a decor can comprise both color patterns as well as three-dimensional structures of the surface.

Interior components must generally be provided with a multilayer primer to obtain a smooth, varnishable surface. Commonly used coating systems consist of two filling layers and two top coat layers. This structure therefore has a high surface weight. This is particularly disadvantageous in vehicles in which weight plays a role, for example, for aircraft. A further disadvantage of the customary coating systems is the long process time of the application methods which is caused by the required flash-off and curing times of the individual layers. The filling layers must also be ground before the application of the next respectively layer to obtain a smooth surface. Conventional processes are thus very labor-intensive and are correspondingly expensive.

SUMMARY

An aspect of the present invention is to provide improved coatings for plastic substrates, in particular for substrates made of thermoplastic plastics and substrates made of fiber plastic composite materials, which form improved surfaces, in particular smoother surfaces, with simpler handling.

In an embodiment, the present invention provides a coating material for producing a barrier layer on a plastic substrate which includes an isocyanate-containing hardener component and a hydroxy-functional binder component. The hydroxy-functional binder component comprise an aqueous polymer dispersion comprising a polyphenylene ether or a copolymer of fluorinated ethylene and a vinyl ether, glass hollow bodies, and at least one of an inorganic filler and an inorganic pigment.

DETAILED DESCRIPTION

In an embodiment, the present invention provides a coating material for producing a barrier layer which has a hydroxy-functional binder component and an isocyanate-containing hardener component. The binder component comprises a combination of hydroxy-functional, aqueous polymer dispersions, glass hollow bodies, and inorganic fillers and/or inorganic pigments. During curing, the glass hallow bodies and fillers are surprisingly embedded in a densely cross-linked resin matrix without major disturbing effects. A stable coating with a very smooth surface is thereby formed. A good result is achieved even with the application of a single layer onto the surface of a component. The coating materials according to the present invention can therefore be used to construct primers. The primers thus obtained can be painted directly with the desired decorative and topcoats without a further post-treatment. For a dry film thickness of at most 50 µm, the coatings according to the present invention exhibit particularly high resistance to mechanical and chemical stresses.

According to the present invention, the binder component contains hydroxy-functional polymer dispersions in water with a nonvolatile content of from 20 to 60 wt %, based on the total weight of the dispersion, for example, 30 to 50 wt %, or, for example, 35 to 45 wt %. Suitable polymers are polyphenylene ethers or copolymers of fluorinated ethylene and vinyl ethers. Copolymers of fluorinated ethylene and vinyl ethers can, for example, be used. The polymer dispersions according to the present invention have a hydroxyl number of from 60 to 100 mg KOH/g, based on the polymer, for example, 70 to 90 mg KOH/g, or, for example, 75 to 85 mg KOH/g. The polymer dispersion is used in amounts ranging from 10 to 40 wt %, based on the total weight of the binder component, for example, in amounts ranging from 15 to 35 wt %, or, for example, 20 to 30 wt %.

In an embodiment of the present invention, the coating materials can, for example, have a pigment volume concentration from 40 to 80%, for example, from 50 to 70%, or, for example, from 55 to 65%. The pigment volume concentration is defined as the ratio of the total volume of all solid particles which are not involved in the film formation to the total volume of the non-volatile constituents.

In an embodiment of the present invention, the binder component can, for example, comprise from 10 to 30 vol %, for example, from 15 to 25 vol %, or, for example, from 16 to 20 vol %, of glass ceramic bodies based on the total volume of the binder component. Suitable glass hollow bodies are, for example, glass hollow spheres. Thin-walled single-cell glass hollow spheres made of borosilicate glasses with a wall thickness of 0.65 to 0.80 µm, for example, of 0.70 to 0.75 µm can, for example, be used. The glass spheres furthermore have an average particle size of 10 to 40 µm, for example, 13 to 32 µm, or, for example, 18 to 23 µm. They also have a nominal density of 0.4 to 0.5 g/m$^3$, for example, of about 0.46 g/m$^3$. With a filling of 5%, they exhibit an alkaline pH value in water in the range from 8 to 12, for example, from 9 to 11.

In an embodiment of the present invention, the binder component can, for example, comprise 5 to 40 wt %, for example, 10 to 30 wt %, or, for example, 15 to 25 wt %, of inorganic fillers and/or inorganic pigments based on the total weight of the binder component.

Suitable fillers are, for example, carbonates such as chalk, limestone powder, calcite, precipitated calcium carbonate, dolomite and barium carbonate, sulfates such as barite, blanc fixe and calcium sulfate, silicates such as talcum, pyrophyllite, chlorite, hornblende and mica, kaolin, wollastonite, shale flour, precipitated calcium silicates, precipitated aluminum silicates, precipitated calcium aluminum silicates, precipitated sodium aluminum silicates, feldspar, mullite, silicas, such as quartz, fused silica, cristobalite, diatomaceous earth, silica, precipitated silica and pyrogenic silica, pumice flour, perlite, calcium metasilicates, fibers of glass or basalt melt, glass flour and slags. Fillers according to the present invention can, for example, be precipitated calcium carbonate, sulfates such as barite and blanc fixe, silicates such as talcum, pyrophyllite, chlorite, hornblende and mica. Talcum can in particular be used.

Suitable pigments are all known inorganic pigments which are familiar to those skilled in the art, such as titanium dioxide, zinc sulfide, lithopones, basic lead carbonate, basic lead sulfate, basic lead silicate, zinc oxide, antimony oxide, iron oxide yellow, chrome yellow, cadmium yellow, nickel titanium yellow, chrome orange, molybdenum orange, cadmium orange, red iron oxide, cadmium red, copper oxide, molybdate red, ultramarine red, mixed phase red, mineral violet, mangan violet, ultramarine violet, iron blue, ultramarine blue, cobalt blue, chromoxide green, chromoxihydrate green, ultramarine green, mixed phase green pigments, iron oxide brown, mixed phase brown, iron oxide black, antimony sulfide, graphite, gas black, thermal black, furnace black, lamp black or acetylene black. Titanium dioxide, zinc sulfide, lithopone, zinc oxide, antimony oxide, iron oxide yellow, nickel titanium yellow, molybdenum orange, iron oxide red, copper oxide, molybdenum red, ultramarine red, mixed phase red, mineral violet, manganese violet, ultramarine violet, iron blue, ultramarine blue, cobalt blue, chromoxide green, chromoxidhydrate green, ultramarine green, mixed phase green pigments, iron oxide brown, mixed-phase brown, iron oxide black, antimony sulfide, graphite, gas black, thermal black, furnace black, flame black or acetylene black can, for example, be used.

In an embodiment of the present invention, the coating materials according to present the invention can, for example, additionally comprise flame retardants. Fire protection regulations generally apply to personal transport vehicles whose interior components must comply therewith. The requirements for flammability, smoke and toxicity of the substances released in case of fire are commonly referred to as FST properties (Flammability, Smoke, Toxicity). The flame resistance is the property of materials, products or components to resist the action of flames or sources of ignition, or the ability to prevent the spread of fire by energetic, kinetic, chemical or mechanical means.

In an embodiment of the present invention, the binder component can, for example, comprise from 10 to 40 vol %, for example, from 15 to 35 vol %, or, for example, from 20 to 30 vol %, of a flame retardant based on the total volume of the binder component. Suitable flame retardants are, for example, inorganic flame retardants, flame retardants containing halogen, nitrogen or boron, intumescent flame retardants, or mixtures thereof. Hydroxides, oxide hydrates and phosphates of Mg, Ca, Sr, Ba, Zn and Al, ammonium polyphosphates, borates such as barium metaborate, calcium metaborate, sodium tetrafluoroborate, potassium tetrafluoroborate, zinc borates and sodium tetraborate decahydrate, antimony oxides such as antimony trioxide and antimony pentoxide in combination with halogen-containing organic flame retardants such as decabromobiphenyl, red phosphorus, borax and expandable graphite can, for example, be used as flame retardants. Hydroxides, oxide hydrates and borates of Al, Mg and Zn, antimony pentoxide in combination with halogen-containing organic flame retardants, such as, for example, decabromobiphenyl, and mixtures of two or more of the above mentioned flame retardants can, for example, be used.

The hardener component of the coating material according to the present invention contains one or more isocyanates. Suitable isocyanates are all isocyanates usually used to cure coating materials, such as, for example, diphenylmethane diisocyanate (MDI), as well as oligomers or polymers based on tolylene diisocyanate (TDI), diphenylmethane diisocyanate (MDI), hexamethylene diisocyanate (HDI), isophorone diisocyanate (IPDI), 4,4'-Diisocyanato dicyclohexylmethane (HMDI), m-xylylene diisocyanate (XDI), 1,6-diisocyanatotrimethylhexane (TMDI) or tetramethylxylylene diisocyanate (TMXDI). Mixtures of the isocyanates mentioned can also be used. Oligomers based on hexamethylene diisocyanate (HDI) can, for example, be used as hardeners.

The binder component and the hardener component are used in a molar ratio of the OH groups of the binder to the NCO groups of the hardener in the range from 1:0.8 to 1:2.6, for example, from 1:1 to 1:2.2, or, for example, from 1:1.5 to 1:2.

The coating materials according to the present invention can, for example, comprise the customary auxiliaries and additives which are familiar to a person skilled in the art, for example, wetting agents, rheology additives, or adhesion promoters. The coating materials can contain up to 15 wt % of additives and auxiliaries based on the total mass of the coating material.

The coating according to the present invention is particularly suitable as a barrier layer in coating systems for the priming of plastics and fiber-plastic composite materials, for example, for the priming of glass- or carbon-fiber-reinforced plastics. These substrates have particularly uneven, rough surfaces due to their manufacture. The known coating materials must be applied in at least two layers in order to obtain a varnishable surface. The coatings according to the present invention show very smooth surfaces even in a single layer application with a dry layer thickness have a maximum of 50 µm, to which the customary decorative and topcoats can be applied. They are in particular also suitable as a primer for high-gloss finishes due to their very smooth surface.

The coating systems according to the present invention have a considerably lower weight compared to the coating systems hitherto used as a primer. Due to the smaller number of layers required, which must in each case be applied and cured, the coatings according to the present invention can also be produced with markedly shortened process times.

By the addition of flame retardants, coatings according to the present invention, which are used as coating layers in coating systems, exhibit fire behavior and FST properties which correspond to the fire protection requirements customary in aviation. The surfaces according to the present invention also exhibit a high abrasion resistance and scratch resistance as well as a good cleaning ability. The coatings according to the present invention can therefore be applied to surfaces of interior components. Such components are, for example, hatrack flaps, ceiling parts, interference cabinets, in particular doors and side walls, partition walls, cove light panels, doors and door frame linings, handrails, control elements for passenger service unit PSU, and window panels. The coatings according to the present invention can in particular be used in coating systems for the decoration of interior components made of plastic-fiber composite materials of monolith or sandwich construction, such as are commonly used for interior construction in aircraft or railway carriages.

The present invention also provides a method for coating plastic components. Suitable plastics are, for example, thermoplastics such as polyetheretherketone (PEEK), polyphenylene sulfide (PPS), polysulfone (PSU), polyetherimide (PEI), or polytetrafluoroethene (PTFE). High-temperature thermoplastics are particularly suitable. The method for coating components made of fiber-plastic composite materials can also be used.

In step a, the component is thereby prepared by the surface being cleaned, dried, and then sanded. In the following step b, a coating material according to the present invention is applied and dried or cured. In the last step c of the process according to the present invention, the customary decorative and topcoats are applied and dried.

The components to be coated must be free of release agents and other impurities. For this purpose, they can be cleaned before the application of the first layer by means of cold cleaners such as, for example, isopropanol. In an embodiment of the method according to the present invention, the component can, for example, be coated with a conductive primer before application of the first layer. Components which are to be coated with electrostatic application methods (ESTA process), such as, for example, fiber-plastic composites and high-temperature-resistant thermoplastics, are in particular provided with a conductive primer. Conductive primers are in this case coatings which produce conductive surfaces, as are necessary in electrostatic application processes.

In an embodiment of the present invention, the component surface can, for example, be trowelled prior to application of the primer in order to compensate for larger surface defects. Components which contain thermoplastic or duromeric plastics in particular often have cavities. The term "cavity" refers to hollow spaces which occur during the setting or curing of the plastic resins. These surface defects are undesirable in the edge region and in the visible region. In order to obtain a smooth surface, spatulas or putty compounds are therefore applied to the surface, hardened, and then ground smooth. According to the present invention, a coarse trowel layer is first applied, cured, and ground. A fine filler layer is subsequently applied, cured, and ground. The applied putty compounds can be cured, for example, by convection drying or IR drying. In the case of convection drying, the applied filler layer is first vented at room temperature for 5 to 40 minutes, for example, for 20 to 35 minutes, or, for example, for about 30 minutes, and then dried at from 50 to 70° C., for example, at around 60° C., for a period of 25 to 60 minutes, for example, about 30 minutes.

The coating material according to the present invention is then applied to the thus prepared surface in step b to produce a barrier layer, and cured. Suitable application methods are, for example, electrostatic application methods and pneumatic compressed air injection processes. A material pressure of 2.3 to 25 bar is used in electrostatic application processes, for example, at 50 mA. In pneumatic application processes, the process is carried out, for example, with nozzles of 1.1 to 1.8 mm at a nebulizer pressure of 3 to 4 bars. The coating obtained in step b is cut off after curing, for example, with 150 grade sandpaper.

The coating system obtained in the process according to the present invention has a dry-film thickness of 30 to 50 μm. This is significantly lower than the coatings obtained with conventional processes. In an embodiment of the process according to the present invention, the coating materials described, which contain additional inorganic flame retardants, are used. Fire-retardant coatings and components will obtain a dry-film thickness of 30 to 50 μm, which meets the FST requirements of aviation. The usual fire-resistant coating systems used to coat interior components in aviation have dry film thicknesses of between 100 and 200 μm. In contrast to the coating systems according to the present invention, they additionally contain at least two fire protection filler layers.

EXAMPLES

Example 1

Composition of a Barrier Layer According to the Present Invention

Binder Component

| Content in Weight % | Raw Material |
| --- | --- |
| 27.0 | Aqueous polymer dispersion comprising copolymers of fluorinated ethylene and vinyl ethers with 40 wt % of non-volatile fractions and a hydroxyl number of 85 mg KOH/g, based on the polymer |
| 13.0 | $TiO_2$ (pigments) |
| 26.5 | Barium sulfate (filling material) |
| 3.8 | Hollow spheres of glass |
| 7.2 | Talcum (filling material) |
| 7.5 | Dispersion additives |
| 0.5 | Defoamers |
| 1.0 | Thickener |
| 13.5 | Water |

Hardener Component

| Content in Weight % | Raw Material |
| --- | --- |
| 80.0 | Aliphatic polyisocyanate based on HDI |
| 15.0 | Adhesion agent |
| 5.0 | Aromatic hydrocarbons |

Example 2

Composition of a FST Barrier Layer According to the Present Invention

Binder Component

| Content in Weight % | Raw material |
| --- | --- |
| 27.0 | Aqueous polymer dispersion comprising copolymers of fluorinated ethylene and vinyl ethers with 40 wt % of non-volatile fractions and a hydroxyl number of 85 mg KOH/g, based on the polymer |
| 13.0 | $TiO_2$ (pigments) |
| 26.5 | $Al(OH)_3$ (flame retardant) |
| 3.8 | Hollow spheres of glass |
| 7.2 | Talcum (filling material) |
| 7.5 | Dispersion additives |
| 0.5 | Defoamers |
| 1.0 | Thickener |
| 13.5 | Water |

Hardener Component

| Content in Weight % | Raw Material |
|---|---|
| 80.0 | Aliphatic polyisocyanate based on HDI |
| 15.0 | Adhesion promoter |
| 5.0 | Aromatic hydrocarbons |

Test specimens from various substrates were provided with the coatings according to the present invention and examined. Sandwich panels with a honeycomb core made of phenolic resin-impregnated paper and with outer layers of glass fiber fabric impregnated with phenolic resin were used as the substrate A. Monolithic glass fiber laminates made of phenolic resin impregnated glass fiber fabric were used as substrate B, and aluminum plates as substrate C. To prepare the test specimens, the binder component and the hardener component were mixed in the molar ratio 1:1.8 based on the amounts of the OH groups of the binder and the NCO groups of the hardener. The resulting mixture was applied to the surfaces of the substrates A, B and C by spray application. The applied layer was flashed off at room temperature for 15 minutes and then cured at 60° C. for 30 minutes. The cured coatings have dry film thicknesses of 40 to 45 μm. The test specimens A1 and A2 were coated with substrate A with the composition according to Examples 1 and 2. The test specimens B1 and B2 were coated with substrate B with the composition according to Examples 1 and 2. The test specimens C1 and C2 were coated with substrate C with the composition according to Examples 1 and 2.

The strengths were tested for a solution of 5 wt % of Turco® 5948-DPM detergent (manufacturer: Henkel KG) in tap water and isopropanol. The test specimens were stored at 23° C. for 168 hours completely immersed in the solution of the detergent or in isopropanol. The test specimens were then wiped and conditioned for 24 hours at 23° C. and 50% relative atmospheric humidity.

Determination of Scratch Resistance

A scraper loaded with a weight was placed on the coating to be tested with the tip and was pulled over the surface perpendicularly on the surface to be tested. It was visually assessed whether the tested coating had a scratching track. The maximum mass of the weight with which the scoring tool can be loaded without the coating being damaged during the test is a measure of the scratch resistance of the coating.

Determination of Adhesion (Cross-Cut Test)

For a grid cut, six parallel cuts are applied to the coating of the test specimens with a cutter knife. The cuts in the coating were deep enough to reach the substrate surface without damaging the substrate surface. Six further parallel cuts were then made which were perpendicular to the first six parallel cuts to form an even square or lattice. The grid spacing was 1 mm. A clear or crepe tape strip with an adhesive force of 8 to 10 N/25 mm was glued to the resulting square. This was removed at an angle of 60° in a time of 0.5 to 1 seconds. The grid or coating was then visually evaluated. The grid cut characteristic value Gt 0 corresponds to a very good adhesion strength, while the characteristic value Gt 5 corresponds to a very poor adhesion strength.

The results are summed up in the following tables.

Adhesion

| Test Specimen | A1 | B1 | C1 | A2 | B2 | C2 |
|---|---|---|---|---|---|---|
| 168 h at room temperature | Gt 0 | Gt 0 | Gt 0 | Gt 0 | Gt 0 | Gt 0 |
| 168 h at 60° C. | Gt 0 | Gt 0 | Gt 0 | Gt 0 | Gt 0 | Gt 0 |
| in Turco ® solution, 24 h at 23° C. | Gt 0 | Gt 0 | Gt 0 | Gt 0 | Gt 0 | Gt 0 |
| in isopropanol, 24 h at 23° C. | Gt 0 | Gt 0 | Gt 0 | Gt 0 | Gt 0 | Gt 0 |

Scratch Resistance

| Coating After | Example 1 | Example 2 |
|---|---|---|
| 168 h at room temperature | 3800 g | 4000 g |
| 168 h at 60° C. | 4000 g | 4000 g |
| in Turco ® solution, 24 h at 23° C. | 4100 g | 4200 g |
| in isopropanol, 24 h at 23° C. | 3500 g | 3500 g |

All test specimens show an unchanged good adhesion (Gt 0) of the coating on the substrate and a high scratch resistance which is also not affected by thermal stress or the action of chemicals.

Test specimens which were coated with the coating according to Example 2 were additionally tested for their fire behavior. All testing of the fire behavior was carried out in accordance with the regulations of the United States Air Traffic Administration (Code of Federal Regulations, 14 CFR Ch. I (1-1-92) Federal Aviation Administration, U.S. Department of Transportation).

Determination of Flammability

The flammability of the coatings was determined according to Pt. 25 App. F part. I para 5. A horizontally arranged coated specimen was flamed with a gas burner for 60 seconds. The length distance was subsequently determined which was burned onto the coating (fire length). The duration of time during which the coating continues to burn after the removal of the gas burner (after-burning time) or the time the burning material from the test specimen drips (post-drip time) was also determined. Sandwich panels A2 and monolithic glass fiber laminate B2 were used as test specimens for this test.

Determination of the Specific Optical Flue Gas Density

The specific optical flue gas density of the flue gases generated during the burning of the coating was determined according to Pt. 25 App. F part. V. Sandwich panels A2 were used as test specimens for this test.

Determination of Flue Gas Composition

The composition of the fumes generated during the burning of the coatings on toxic ingredients was investigated. The smoke was thereby examined in the context of the above examination of the specific optical smoke density smoke and the concentration of hydrogen cyanide (HCN), carbon monoxide (CO), nitrous gases ($NO_x$), sulfur dioxide ($SO_2$), hydrogen chloride (HCl), and hydrogen fluoride (HF) in the flue gas determined. Sandwich panels A2 were used as test specimens for this test.

Determination of Heat Release

The heat release was determined according to Pt. 25 App. F part. IV. The total heat release occurring during the burning of the coating as well as the maximum occurring heating power were measured. Sandwich panels A2 and aluminum plates C2 were used as test specimens for this test.

The results are summed up in the following tables.

Flammability

| Test Specimen | A2 | B2 |
|---|---|---|
| Fire length [mm] | 47 | 25 |
| After-burning time [s] | 3 | 0 |
| Dripping time [s] | 0 | 0 |

Specific Flue Gas Density and Flue Gas Composition

| Test Specimen | A2 |
|---|---|
| Spec. flue gas density | 15 |
| c(HCN) in [ppm] | 2.5 |
| c(CO) in [ppm] | 80 |
| c(NO$_x$) in [ppm] | 7 |
| c(SO$_2$) in [ppm] | 4 |
| c(HF) in [ppm] | 0 |
| c(HCl) in [ppm] | 0 |

Heat Release

| Test Specimen | A2 | C2 |
|---|---|---|
| Total heat release in [kW/m$^2$] | 29 | 8 |
| Maximum power in [kW min/m$^2$] | 30 | 5 |

The present invention is not limited to embodiments described herein; reference should be had to the appended claims.

What is claimed is:

1. A coating material for producing a barrier layer on a plastic substrate, the coating material comprising:
   an isocyanate-containing hardener component;
   a hydroxy-functional binder component comprising,
      an aqueous polymer dispersion comprising a polyphenylene ether or a copolymer of fluorinated ethylene and a vinyl ether,
      glass hollow bodies, and
      an inorganic pigment; and
   an inorganic pigment volume concentration of from 40 to 80%, the inorganic pigment volume concentration being a total volume of all solid particles which are not involved in a film formation to a total volume of non-volatile constituents.

2. The coating material as recited in claim 1, further comprising an inorganic filler.

3. The coating material as recited in claim 1, wherein the hydroxy-functional binder component comprises the aqueous polymer dispersion in an amount of 10 to 40 wt % based on a total weight of the hydroxy-functional binder component.

4. The coating material as recited in claim 1, wherein the aqueous polymer dispersion comprises the copolymer of the fluorinated ethylene and the vinyl ether.

5. The coating material as recited in claim 1, wherein the hydroxy-functional binder component comprises from 10 to 30 vol % of the glass hollow bodies based on a total volume of the hydroxy-functional binder component.

6. The coating material as recited in claim 1, wherein the hydroxy-functional binder component comprises from 5 to 40 wt % of the inorganic pigment based on a total weight of the hydroxy-functional binder component.

7. The coating material as recited in claim 2, wherein, the inorganic filler is selected from a precipitated calcium carbonate, a barite, blanc fixe, talcum, pyrophyllite, a chlorite, hornblende and mica, and
the hydroxy-functional binder component comprises from 5 to 40 wt % of the inorganic filler and the inorganic pigment based on a total weight of the hydroxy-functional binder component.

8. The coating material as recited in claim 1, wherein the inorganic pigment is selected from titanium dioxide, zinc sulfide, lithopone, zinc oxide, antimony oxide, iron oxide yellow, nickel titanium yellow, molybdenum orange, iron oxide red, copper oxide, molybdenum red, ultramarine red, mixed phase red, mineral violet, manganese violet, ultramarine violet, iron blue, ultramarine blue, cobalt blue, chromoxide green, chromoxidhydrate green, ultramarine green, mixed phase green pigments, iron oxide brown, mixed-phase brown, iron oxide black, antimony sulfide, graphite, gas black, thermal black, furnace black, flame black, and acetylene black.

9. The coating material as recited in claim 1, wherein the hydroxy-functional binder component further comprises a flame retardant which is selected from a hydroxide, an oxide hydrate of Mg, Ca, Sr, Ba, Zn and Al, a phosphate of Mg, Ca, Sr, Ba, Zn and Al, an ammonium polyphosphate, a borate, an antimony oxide in combination with a halogen-containing organic flame retardant, red phosphorus, borax, and an expandable graphite.

10. The coating material as recited in claim 1, wherein the isocyanate-containing hardener component comprises a polyisocyanate selected from diphenylmethane diisocyanate MDI, an oligomer based on toluylene diisocyanate TDI, a polymer based on toluylene diisocyanate TDI, diphenylmethane diisocyanate MDI, hexamethylene diisocyanate HDI, isophorone diisocyanate IPDI, 4,4'-Dicyclohexylmethane HMDI, m-xylylene diisocyanate XDI, 1,6-diisocyanatotrimethylhexane TMDI, tetramethylxylylene diisocyanate TMXDI, and mixtures thereof.

11. The coating material as recited in claim 1, wherein the hydroxy-functional binder component and the isocyanate-containing hardener component have a molar ratio of OH groups of the hydroxy-functional binder component to NCO groups of the isocyanate-containing hardener component in a range of from 1:0.8 to 1:2.6.

12. A method of using the coating material as recited in claim 1 in a coating system for a priming of a plastic substrate surface or a fiber-plastic composite material substrate, the method comprising:
   providing the coating material as recited in claim 1;
   providing the plastic substrate surface or the fiber-plastic composite material substrate; and
   applying the coating material on the plastic substrate surface or on the fiber-plastic composite material substrate as a primer.

13. A method for producing a coating system on a component made of a plastic or a fiber-plastic composite material, the method comprising:
   preparing a surface of the plastic or a surface of the fiber-plastic composite material;
   applying the coating material as recited in claim 1 onto the surface of the plastic or onto the surface of the fiber-plastic composite material to obtain an applied coating material;
   curing the applied coating material to obtain a cured coating material; and
   applying a varnish to the cured coating material.

14. The method as recited in claim 13, wherein the applying of the coating material is performed by an electrostatic application method or by a pneumatic compressed air injection method.

15. An interior component comprising a plastic or a fiber-plastic composite each of which comprise at least one coating comprising the coating material as recited in claim 1.

* * * * *